(No Model.)
H. CHRISTENSON & W. TIMMERS.
POTATO PLANTER.
No. 331,278. Patented Dec. 1, 1885.
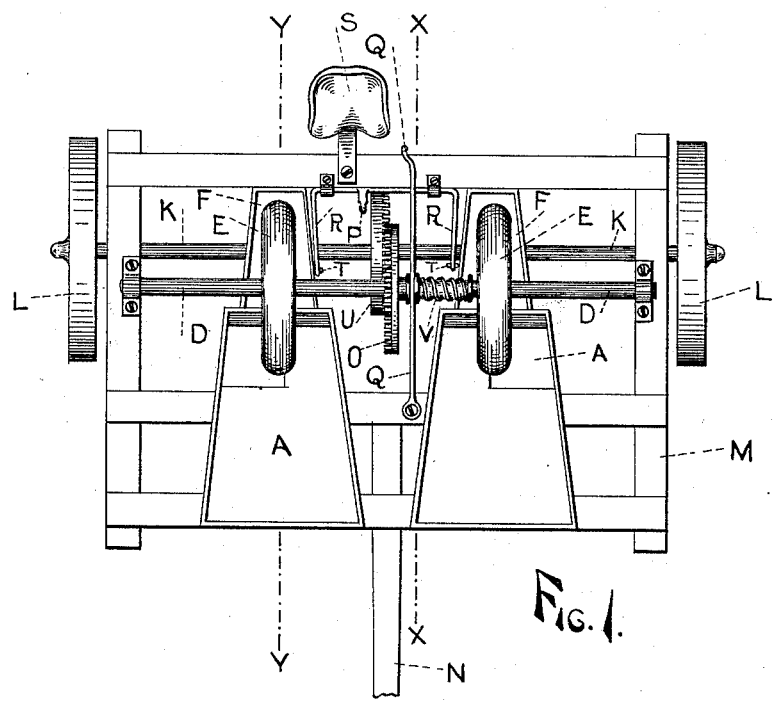
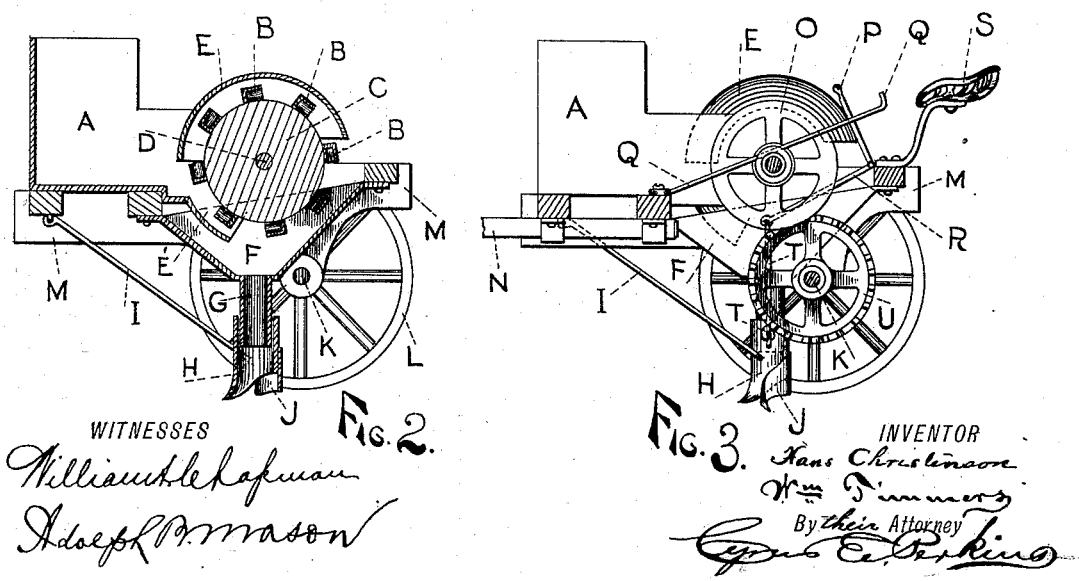

UNITED STATES PATENT OFFICE.

HANS CHRISTENSON AND WILLIAM TIMMERS, OF GRAND RAPIDS, MICH.

POTATO-PLANTER.

SPECIFICATION forming part of Letters Patent No. 331,278, dated December 1, 1885.

Application filed August 7, 1885. Serial No. 173,873. (No model.)

*To all whom it may concern:*

Be it known that we, HANS CHRISTENSON and WILLIAM TIMMERS, citizens of the United States, residing at Grand Rapids, in the county of Kent and State of Michigan, have invented certain new and useful Improvements in Potato-Planters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a plan view of our invention. Fig. 2 is a sectional view on the line Y Y of Fig. 1. Fig. 3 is a sectional view on the line X X of Fig. 1.

Similar letters refer to similar parts throughout the several views.

Our invention relates to improvements in machines for planting potatoes, whereby the potatoes are carried in a box or hopper, fed to cups upon a rotating wheel, and delivered into the drill-spout, dropped, and covered.

The object of our invention is to greatly expedite the work of the planter, and to make easy and even pleasant a task that is usually toilsome and slow.

Referring to the drawings, we describe our invention as follows:

A A are the boxes or hoppers in which the potatoes are carried. Instead of two boxes, they may be united in one, the center of the bottom being made highest and sloping toward the feed. As shown, the boxes are made lowest at one corner, causing the seed to gravitate in that direction.

B B are the cups upon the wheels C C, which are rigid upon the shaft D. Over said cups and secured to said boxes A A are the semicircular hoods E E. Beneath said wheels, and leading from the boxes A A, are the conductors E', fitting around the said cups. Also below said wheels are the troughs F F, inclining to and terminating in the conductors G G, having telescoped upon their lower ends the drill-points H H, adapted to open the ground to receive the seed, and provided with the wings J J, so constructed that they cover the seed as the machine moves along. Said drill-points may be raised or lowered, being held in front by the supporting-rods I I, fastened by eyebolts, and at the rear by the toggle-jointed lever attached to the rear beam of the sulky, composed of the lower member, T, the upper member, R, and the handle P. The axle K of the sulky forms a shaft, the wheels L L being rigidly attached thereto. Upon said shaft is the cog-wheel U, and on the shaft D is the cog-wheel O, the two forming a gearing by which the shaft D is turned, the latter being properly journaled upon the side beams, M, of said sulky.

Upon the shaft D, and attached to the cog-wheel O, is the coiled spring V, the office of which is to hold the gearing in place, and the machine may be thrown out of gear by using the lever Q, passing through said spring. (See Fig. 1.)

S is the seat of the sulky, and N is the tongue.

It will be seen that the boxes A A, being filled with seed, will feed the same to the lower corners, where it will be taken by the cups B, which are placed at regular intervals on the wheels C. As said wheels revolve, the seed will be dropped into the conductor G and fall into the channel made by the drill-points H, and be immediately covered by the wings J.

Our invention contemplates the planting of two rows of potatoes at one and the same time. As before said, the hoppers A A might be united in one, sloping to the lower outside corners from a common center; and we do not limit ourselves to the particular feed-box here shown and described.

Having thus described our invention, what we claim, and desire to secure by Letters Patent of the United States, is—

The combination of the shaft K upon the wheels L, the shaft D, the gearing O U, regulated by the spring V and lever Q, and the wheels C C, covered by the hoods E and bearing the cups B, with the boxes A A, having the conductors E', and the troughs F, terminating in the conductors G, carrying the adjustable drills H, provided with the wings J, said drills being supported in front by the rod I and regulated by the lever P, all substantially as shown and described.

In testimony whereof we affix our signatures in presence of two witnesses.

HANS CHRISTENSON.
WILLIAM TIMMERS.

Witnesses:
WILLIAM A. CHAPMAN,
ADOLPH B. MASON.